United States Patent [19]

Annis

[11] 4,239,869

[45] Dec. 16, 1980

[54] PHENOLIC RESINS WITH IMPROVED LOW TEMPERATURE PROCESSING STABILITY

[75] Inventor: Myron C. Annis, North Tonawanda, N.Y.

[73] Assignee: Hooker Chemicals & Plastics Corp., Niagara Falls, N.Y.

[21] Appl. No.: 29,946

[22] Filed: Apr. 13, 1979

Related U.S. Application Data

[63] Continuation-in-part of Ser. No. 915,335, Jun. 13, 1978.

[51] Int. Cl.³ .......................... C08G 8/10; C08G 8/28
[52] U.S. Cl. ..................................... 525/503; 260/38; 528/129; 528/137; 528/143; 528/165; 264/328.2
[58] Field of Search ............... 528/137, 143, 129, 165; 525/503

[56] References Cited

U.S. PATENT DOCUMENTS

| | | | |
|---|---|---|---|
| 2,816,085 | 12/1957 | Anas et al. | 528/131 |
| 3,687,896 | 8/1972 | Vargiu et al. | 528/137 |
| 3,959,433 | 5/1976 | Sauers | 264/328 |

*Primary Examiner*—Wilbert J. Briggs, Sr.
*Attorney, Agent, or Firm*—Peter F. Casella; James F. Mudd

[57] ABSTRACT

Phenolic novolak resins are described which provide extended resin stability at relatively low temperatures without significant adverse affect on the cure speed at the molding temperature. The resins are especially suited for use in runnerless injection or cold manifold molding processes, but can also be used in transfer, compression and injection molding processes.

4 Claims, No Drawings

PHENOLIC RESINS WITH IMPROVED LOW TEMPERATURE PROCESSING STABILITY

REFERENCE TO PRIOR APPLICATION

This is a continuation-in-part of application Ser. No. 915,335, filed June 13, 1978.

BACKGROUND OF THE INVENTION

For many years, thermosetting phenolic resins have been molded using standardized compression or transfer molding techniques. While these techniques generally provide molded articles having excellent dimensional stability and good physical properties, technical improvements leading to cost reduction and increased productivity are required in order to enable thermosetting phenolics to remain competitive with other plastics and materials of constructions such as metals and ceramics. One such improvement has been the application of injection molding techniques to fabricate parts from thermosetting phenolic molding compositions. The injection molding process offers the advantages of reduced molding cycles, better control of process variables, and increased productivity as compared with conventional compression and transfer molding processes. The major disadvantage with the injection molding of thermosetting materials lies in the inevitable generation of a considerable amount of scrap, particularly when employing multiple cavity systems. This scrap represents thermosetting material that has cured (become infusible) in the runner and cannot be reused. The amount of non-reusable scrap generated in this fashion can be substantial, typically ranging anywhere from 15% to 80% of the total amount of material required to mold a part.

A more recent technical advance in the molding art has been the adaptation of the runnerless injection, or cold manifold, process to injection mold thermosetting phenolics. In the cold manifold process, the material in the sprue and manifold system (the so-called "runner") is maintained at a sufficient temperature to plasticize the material, without causing it to cure or "set-up" prematurely.

Thus, when a cured part is removed from the mold cavity, the material in the sprue and manifold becomes part of the next molding, instead of being discarded as in conventional injection and transfer molding operations, the runnerless injection process, therefore, provides for significant savings in material, and, in addition, increased industrial efficiency by the elimination of secondary operations such as extra finishing and secondary gate grinding.

The thermosetting materials employed in runnerless injection processes differ, in certain respects, from materials normally employed in conventional injection processes due to the different requirements of each process. One significant difference is that a standard injection or transfer molding material typically has a stiffer plasticity for faster molding cycles. In contrast, a runnerless injection material should remain in a plasticized or fused condition in the manifold or barrel of the mold for extended periods of time without curing prematurely at the manifold temperature, i.e. usually about 125° C., while being capable of curing rapidly in the mold cavity at the molding temperature, i.e. usually about 170° C. In addition, the molded part should also have good dimensional stability and physical properties.

The prior art discloses various thermosetting compositions which are directed to runnerless injection applications. For instance, U.S. Pat. No. 3,959,433, to Sauers, discloses the addition of non-polymeric para-substituted phenols, such as Bisphenol-A, to a thermosetting phenolic resin in order to reduce the viscosity of the resin in the manifold, i.e. to improve its processability. This composition is limited in terms of the range of monomer or dimer employed, generally being less than 35 parts by weight based on 100 parts by weight of resin, since introducing higher concentrations in the resin composition tends to adversely affect the physical properties of a molded article by decreasing the cross-linking density of the cured article. Moreover, this composition has not been found to be effective in significantly improving the processing stability of the resin at the manifold temperature. As this is a critical parameter in any runnerless injection molding process, it will readily be appreciated that a continuing need exists for improved runnerless injection materials, and, in particular, for improved materials having enhanced processing stability.

While the phenolic resins of this invention are primarily useful in runnerless injection processes, where low temperature processing stability is a critical factor, they also find utility in more conventional molding processes such as injection molding, extrusion, and transfer molding processes where material savings can also be a significant factor.

SUMMARY OF THE INVENTION

Accordingly, this invention provides phenolic novolak resins with improved thermal stability at moderately elevated temperatures, such as 125° C., but which have a commercially acceptable cure speed on molding at elevated temperatures, such as 170° C. The phenolic novolak resins of the invention are characterized as having a narrow molecular weight distribution as measured by the Heterogeneity Index (HI), which is the ratio of weight average molecular weight ($\overline{M}w$) to number average molecular weight ($\overline{M}n$). The novolak resins of the invention have a Heterogeneity Index in the range of about 1.5 to 2. The weight average molecular weight ($\overline{M}w$) is generally in the range of 600 to 1000, and the number average molecular weight ($\overline{M}n$) is generally in the range of about 350 to 450. The resins of the invention have a low melt viscosity which is generally in the range of about 500 to 1200 centipoises at 135° C. The resin compositions of this invention have significantly enhanced processing stability at the manifold temperature of a runnerless injection molding apparatus.

DESCRIPTION OF THE PREFERRED EMBODIMENTS

The phenolic novolak resins of this invention are prepared from components well-known to those skilled in the plastics art. These resins may be prepared by a variety of methods.

The phenols which are suitable for use in this invention include phenol per se (unsubstituted), and substituted phenols which are unsubstituted in the para position, wherein at least about half the substituted phenols have at least two of the ortho- and para-positions of the phenol nucleus available for condensation (unsubstituted). Such phenols may be characterized by the following general formula:

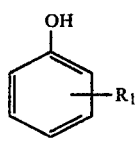

where $R_1$ can be hydrogen, fluorine, chlorine, bromine or a suitable substituent selected from the following:
  a. Alkyl and alkenyl groups of 1 to 18 carbon atoms in any of their isomeric forms and substituted on the phenolic nucleus in the ortho- or meta-positions;
  b. Alicyclic groups of 5 to 18 carbon atoms such as cyclohexyl, cyclopentyl, methyl cyclohexyl, butyl cyclohexyl, and the like;
  c. Aromatic or aralkyl groups of 6 to 18 carbon atoms such as phenyl, alpha-methyl benzyl, benzyl, cumyl and the like;
  d. Alkyl, alkenyl, alicyclic, aryl and aralkyl ketones wherein the hydrocarbon is defined as hereinbefore;
  e. Alkyl, alkenyl, alicyclic, aryl and aralkyl carboxylic groups wherein the hydrocarbon is defined as hereinbefore, and mixtures thereof. As indicated, the hydrocarbon radicals preferably have from 1 to 18 carbon atoms.

Suitable substituted phenols include meta-cresol, ortho-cresol, ortho-chlorophenol, ortho-ethylphenol, meta-butylphenol, ortho-butylphenol, and the like, as well as mixtures thereof.

The preferred phenols are unsubstituted and have both ortho- and para-positions available for condensation reaction.

The aldehydes or mixtures thereof which can be employed are those which are capable of reacting with a phenol or bisphenol, provided the aldehydes do not contain a functional group or structure which is detrimental to the condensation reaction. The preferred aldehyde is formaldehyde, which can be in aqueous solution or in any of its low polymeric forms such as paraform or trioxane or gaseous anhydrous formaldehyde. The aldehydes preferably contain 1 to 8 carbon atoms. Other examples include acetaldehyde, propionaldehyde, butyaldehyde, benzaldehyde, furfural, 2-ethyl-hexanal, ethylhexanal, ethylbutyraldehyde, heptaldehyde, pentaerythrose, glyoxal, chloral, mesityl oxide, and the like.

The ratio of aldehyde to phenol can be varied to prepare condensates of various molecular weights, and the viscosity of the final condensation product can be regulated by the molecular weight of the phenol-aldehyde condensate. Generally, the amount of aldehyde varies from about 0.63 to 0.68 mole per mole of phenol, and preferably from about 0.65 to 0.67 mole per mole of phenol.

The phenolic resin compositions of this invention can be compounded with various additives and adjuvants, such as curing accelerators, metal oxides such as lime, ZnO, MgO and mixtures thereof, fillers such as glass fiber, wood flour, clay, talc, and the like, stabilizers, plasticizers, curing accelerators, antistatic agents, and lubricants such as stearic acid and glycerol monostearate.

The novolak resin of this invention are prepared with a deficiency of aldehyde, preferably in the presence of an acid catalyst such strong mineral or organic acids such as sulfuric acid and oxalic acid, and will only cure or cross-link in the presence of a curing amount of a suitable aldehyde donor compound. In commercial practice, the aldehyde donor commonly employed is hexamethylenetetramine which is blended in finely divided form with the pulverized resin. Upon the addition of a curing amount of hexamethylenetetramine (or some other suitable aldehyde donor), the resin becomes thermosetting and will permanently fuse upon heating.

The resin, fillers, cross-linking agents, and other ingredients can be thoroughly blended by ball-milling and fused by roll-milling, extrusion or other conventional techniques. After it is fused, the molding composition can be tested by curing in a Brabender Plasticorder (ASTM designation D-1898), an instrument which continuously measures the torque exerted in shearing a polymer, and the time interval to the onset of cure of the resin at a particular temperature can be measured to determine the barrel life and the molding cycle.

Prolonging the barrel life of the resin may result in a somewhat longer molding cycle as comparted to conventional resin systems due to a slower cure speed at the molding temperature. The molding cycle may be shortened by the adjustment of certain operating variables, such as by increasing the molding temperature, or by employing a resin composition having a lower proportion of available theoretical para-phenyl linkages.

The following examples further illustrate the various aspects of the invention but are not intended to limit it. For instance, in accordance with known practice, the molding composition may also include additional appropriate ingredients including pigments, lubricants, mold release agent and the like. Where not otherwise specified in this specification and claims, temperatures are given in degrees centigrade, and all parts and percentages are by weight.

EXAMPLE 1

A phenol-formaldehyde novolak resin was prepared by reacting 0.66 moles of formaldehyde per mole of phenol utilizing 0.25 parts of a sulfuric acid catalyst based on 100 parts of charged phenol. The mixture was subsequently neutralized, dehydrated to melt, dumped, and allowed to solidify. The resulting resin has the following properties within the stated ranges:

Gel Permeation Chromatography (GPC)

| | |
|---|---|
| $\overline{M}w$ | 600–1000 |
| $\overline{M}n$ | 350–450 |
| Heterogeneity Index (H.I.) | 1.5–2.0 |
| Melt Viscosity @ 135° C. (centipoises) | 500–1200 |

100 parts of the solid novolak product was then ground to a fine particle size and milled with about 21 parts of hexamethylenetetramine (hexa), 2 parts of glycerol monostearate, 1 part of stearic acid, and 1 part of zinc stearate.

100 parts of the resin-hexa compound were mixed with 34.6 parts of 60 mesh wood flour, 16.3 parts of 100 mesh wood flour, 7.7 parts of bark wood flour, 5.8 parts of diatomaceous earth, 13.5 parts of clay, 7.7 parts of lime, and 1.5 parts of black dye. The compound was ball-milled for 1 hour, roll-milled at 70° C. (front roll) and 90° C. (back roll), and ground thru a ¼" screen. A blending wax was added and the resulting molding compound was analyzed using a Brabender Plasticorder. The results are set forth below in Table 1.

TABLE 1

|  | MINIMUM TORQUE (m-g) | FLOW DURATION (mm) | PEAK TORQUE (m-g) | PEAK TIME (min.) |
|---|---|---|---|---|
| 125° C. ANALYSIS | 275 | 163 | 2300 | 8.1 |
| 170° C. ANALYSIS | 110 | 24 | 1125 | 1.4 |

EXAMPLE 2

100 parts of phenol, 5 parts of toluene and 0.25 part of sulfuric acid were charged to a reaction kettle, mixed and heated to 105°–110° C. The kettle was equipped with a reflux condenser and a phase separator. 43.75 parts of 50% aqueous formaldehyde was added to the kettle beneath the surface at a rate to maintain the temperature at 105°–110° C. The top layer of liquid in the phase separator was returned to the reaction kettle and the bottom layer was passed to a receiver. The reaction temperature was held at 105°–110° C. until less than 0.5% free formaldehyde remained. Thereafter, the reaction mixture was neutralized slowly with a slurry of 0.275 parts of lime and 1 part of water. The reaction mixture was mixed for 10 minutes and then vacuum stripped until the resulting product had a brittle point of 63°–70° C. clear. The reaction product was removed from the kettle and solidified. The resulting resin has the following properties within the stated ranges:

Gel Permeation Chromatography (GPC)

| $\overline{M}w$ | 600–1000 |
|---|---|
| $\overline{M}n$ | 350–450 |
| Heterogeneity Index (H.I.) | 1.5–2.0 |
| Melt Viscosity @ 135° C. (centipoises) | 500–1200 |

100 parts of the resulting resin were ground to a particle size of about 1/8 inch and mixed for one hour with 21 parts of hexamethylenetetramine (hexa), 1 part of zinc stearate and 1 part of stearic acid and 2 parts of glyceryl monostearate. 1700 parts of the resulting hexa-resin compound was blended with 375 parts of wood flour, 610 parts of clay, 225 parts of cellulose filler, 90 parts of diatomaceous earth, 51 parts of black dye, 18 parts of zinc stearate, and 80 parts of magnesium oxide. The compound was ball-milled for one hour and then roll-milled at 80° C. (front roll) and 120° C. (back roll), and ground through a ¼ inch screen to provide a molding compound.

EXAMPLES 3–5

Molding compounds were prepared using the proportions of resin and fillers and the compounding conditions of Example 2 except that the phenolic resins had the following properties within the following ranges compared to Example 3.

| Example No. | 2 | 3 | 4 | 5 |
|---|---|---|---|---|
| GPC: $\overline{M}w$ | 600–1000 | 800–1000 | 1000–1400 | 1200–1600 |
| $\overline{M}n$ | 350–450 | 350–450 | 350–450 | 350–450 |
| H.I. | 1.5–2.6 | 2.1–2.5 | 2.5–3.1 | 2.7–3.2 |
| M.V. @ 135° C. | 500–1200 | 1500–2500 | 2500–4000 | 3000–4000 |

The molding compounds of Examples 2–5 were analyzed in a Brabender Plasticorder and subjected to additional testing with the following results:

| Example No. | 2 | 3 | 4 | 5 |
|---|---|---|---|---|
| Brabender @ 125° C. | | | | |
| Minimum Torque m-g | 400 | 550 | 675 | 675 |
| Cure Time (sec.) | 558 | 473 | 384 | 342 |
| S-cup Plasticity(sec.) (ASTM D-731) | | | | |
| 2500 psi | 10.0 | 11.0 | 15.2 | 14.2 |
| 5000 psi | 9.0 | 8.8 | 11.6 | 12.0 |
| Shrinkage (inch/inch) | 0.0054 | 0.0053 | 0.0045 | 0.0055 |
| Molded Deflection (mils deflection) (mils thickness) | 68(120) | 56(120) | 50(120) | 44(124) |

The composition of the invention exemplified in Example 2 had the lowest minimum torque which indicates this composition of invention would exert reduced molding pressures in commercial practice. This would improve productivity through reduced wear on equipment and increases in effective molding capacities. The longer cure time reflects improved stability of the molding composition while in the plasticized state before molding.

EXAMPLES 6–8

4500 parts of the resins employed in Examples 2, 3 and 4 were each blended respectively with 1500 parts cellulose filler, a total of 4000 parts mineral fillers, 1200 parts of glass fiber, 50 parts dye, and 350 parts of wax and additives. (The compound with the resin of Example 2 was blended with 300 parts of wax and additives). The resulting compounds were analyzed on the Brabender Plasticorder and subjected to additional testing. The results are shown in Table 2.

EXAMPLES 9–11

4000 parts of the resin of Example 2 and 4750 parts of the resins of Examples 3 and 4 were each blended respectively with 1500 parts cellulose filler, a total of 4000 parts of mineral fillers, 1200 parts of glass fiber, 150 parts of dye, and 350 parts of wax and additives. (The compound with the resin of Example 2 was blended with 300 parts of wax and additives). The resulting compounds were analyzed on the Brabender Plasticorder and subjected to additional testing. The test results are shown in Table 2.

TABLE 2

| EXAMPLE NO. | 6 | 7 | 8 | 9 | 10 | 11 |
|---|---|---|---|---|---|---|
| Resin of Example No. | 2 | 3 | 4 | 2 | 3 | 4 |
| Brabender @ 125° C. | | | | | | |
| Minimum Torque | 300 | 1000 | 875 | 275 | 800 | 700 |
| Cure Time (sec.) | 480 | 264 | 242 | 567 | 281 | 252 |
| Brabender @ 170° C. | | | | | | |
| Minimum Torque | 90 | 525 | 600 | 75 | 525 | 625 |
| Cure Time (sec.) | 76 | 63 | 60 | 75 | 66 | 66 |
| S-cup Plasticity (sec.) | | | | | | |
| 2500 psi | 14.8 | 19.0 | 16.0 | 16.6 | 16.0 | 13.0 |
| 5000 psi | 10.6 | 13.4 | 12.4 | 12.6 | 12.0 | 10.4 |
| Moisture % | 0.4 | 1.8 | 1.8 | 0.6 | 1.6 | 1.4 |
| Durez Serpentine Flow (inches) | | | | | | |
| 300 psi | — | 10¼ | 11 | — | 13¼ | 14 |
| 200 psi | 20 | — | — | 18 | — | — |

The Brabender results from Examples 6 and 9 which exemplify the invention show dramatically lower minimum torque at 125° C. which indicates these compositions of the invention would exert markedly reduced molding pressures in commercial practice. The result is improved productivity through reduced equipment wear and increased effective molding capacities. The longer cure time at 125° C. reflects improved stability of the molding composition while in the plasticized state before molding.

Despite the longer cure times in the Brabender at 170° C., the composition of the invention based on the resin of Example 2 exhibited improved stability in the manifold without degradation of cure time at molding temperatures, when testing was performed in commercial scale equipment.

The foregoing embodiments are extended to illustrate the invention without limiting it thereby. Various modifications can be made in the invention without departing from the spirit and scope thereof.

I claim:

1. A phenolic novolac molding composition having improved low temperature processing stability comprising a phenol-aldehyde resin containing about 0.63 to 0.68 mole aldehyde per mole of phenol, and having a heterogeneity index in the range of about 1.5 to 2, a melt viscosity in the range of 500 to 1200 centipoises at 135° C., and a brittle point of 63° to 70° C. clear.

2. The molding composition of claim 1 wherein the aldehyde is formaldehyde.

3. The composition of claim 2 which includes hexamethylenetetramine and a filler material.

4. A molded article formed by curing the composition of claim 3.

* * * * *